US005555663A

United States Patent [19]

Burgeson

[11] Patent Number: 5,555,663
[45] Date of Patent: Sep. 17, 1996

[54] HEATED ANIMAL SCENT LURE DISPENSER

[75] Inventor: John R. Burgeson, Anoka, Minn.

[73] Assignee: Wildlife Research Center, Inc., Anoka, Minn.

[21] Appl. No.: 337,989

[22] Filed: Nov. 14, 1994

[51] Int. Cl.$^6$ ................................................. A01M 31/00
[52] U.S. Cl. ........................................................ 43/1; 239/53
[58] Field of Search ................................ 43/1; 239/6, 13, 239/34, 42, 53, 54, 135, 136, 51; 222/4, 146.2, 146.5, 187

[56] References Cited

U.S. PATENT DOCUMENTS

| 502,336 | 8/1893 | Weil | 222/204 |
|---|---|---|---|
| 688,544 | 12/1901 | Pitts | 222/420 |
| 3,046,192 | 7/1962 | Bilyeu | 43/1 X |
| 3,198,437 | 8/1965 | Faglie | 239/309 |
| 3,589,338 | 6/1971 | Lovitz | 119/51 |
| 3,990,403 | 11/1976 | Jacobs | 119/72.5 |
| 4,506,806 | 3/1985 | Lincoln et al. | 222/175 |
| 4,558,662 | 12/1985 | Peterson | 119/77 |
| 4,607,755 | 8/1986 | Andreozzi | 215/1 A |
| 4,667,430 | 5/1987 | Ziese, Jr. | 43/1 |
| 4,682,715 | 7/1987 | Reeves | 222/175 |
| 4,771,563 | 9/1988 | Easley | 43/1 |
| 4,773,177 | 9/1988 | Gray, II et al. | 43/1 |
| 4,872,442 | 10/1989 | Manker | 126/263 |
| 4,938,168 | 7/1990 | Meidell | 119/77 |
| 5,033,653 | 7/1991 | Kaufman | 222/185 |
| 5,058,563 | 10/1991 | Manker | 126/263 |
| 5,060,411 | 10/1991 | Uhlman | 43/1 |
| 5,161,646 | 11/1992 | Aurich et al. | 222/187 |
| 5,220,741 | 6/1993 | Burgeson | 43/1 |
| 5,279,062 | 1/1994 | Burgeson | 43/1 |

FOREIGN PATENT DOCUMENTS 2456472 of 0000 France .

OTHER PUBLICATIONS

Wellington Outdoors, "#69 Scent Dispenser" 1992.

Primary Examiner—J. Elpel
Attorney, Agent, or Firm—Palmatier, Sjoquist & Helget, P.A.

[57] ABSTRACT

A heated animal scent lure dispenser includes a container with an interior, exterior, threaded neck and opening at the neck. A cap is threadable onto the neck for at least partially closing the opening. A heating element or chemical charge is locatable within the container which will in turn heat the container. A wick suitably made from a knit fabric substantially covers the container with a large surface area upon which the liquid scent lure may be placed and from which the liquid scent lure may be dispersed under the influence of the heated container. The wick may also have insulation qualities and a suitable plastic bag or the like may be used to seal the dispenser within the bag and to starve the dispenser from oxygen.

33 Claims, 2 Drawing Sheets

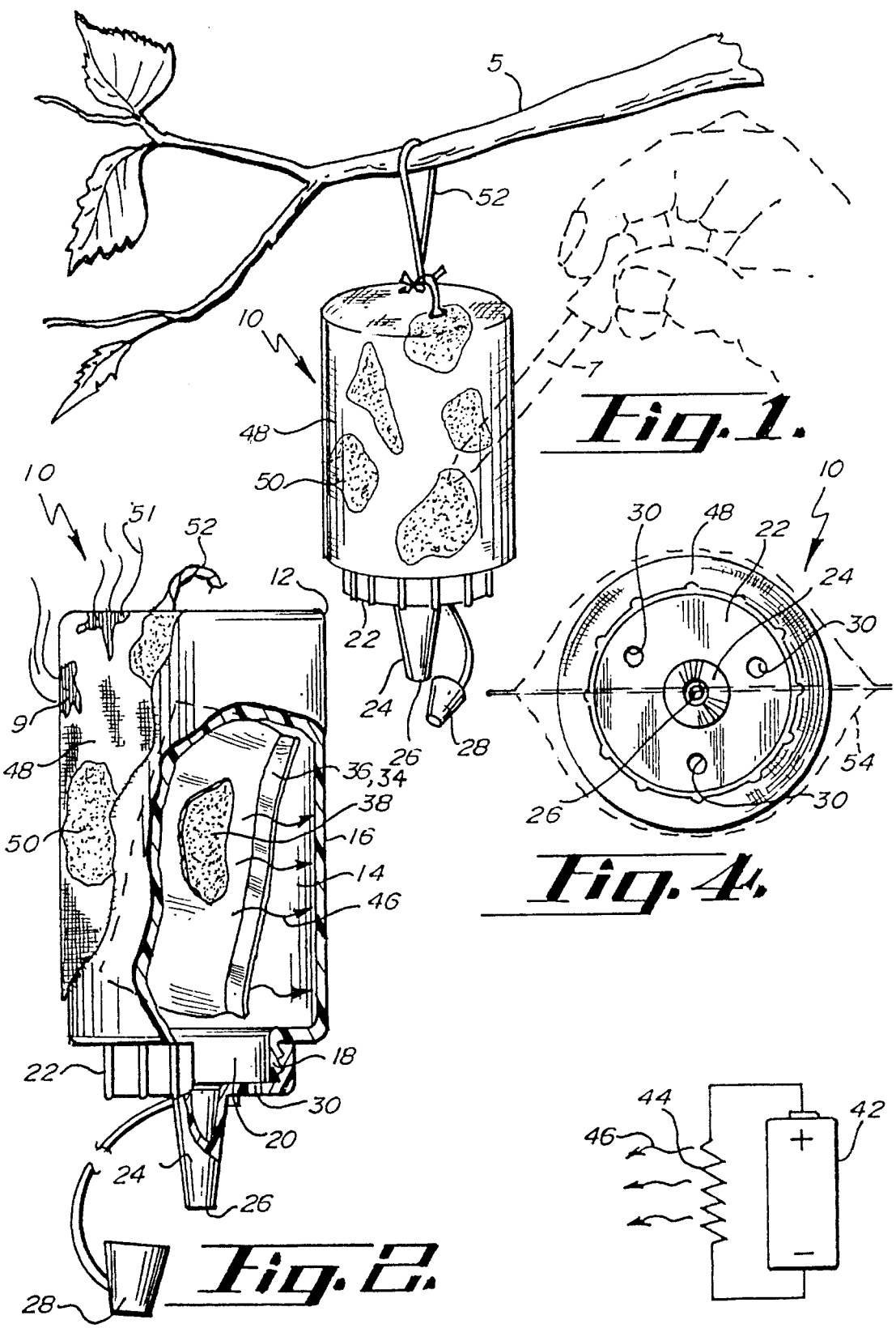

HEATED ANIMAL SCENT LURE DISPENSER

BACKGROUND OF THE INVENTION

This invention relates to a dispenser for animal scent lures, and more particularly to a heated animal scent lure dispenser.

It has long been known that animals, such as game animals like deer and elk are naturally drawn to certain natural scents, such as the urine of the same species of animal. Hunters often use these scents to attract the animals into their vicinity for shooting or observation.

The scent lures are typically in a liquid form and may be used in any of a variety of ways. One way is to pour the liquid scent lure onto absorbent pads, which are then hung on branches or twigs where the scent is allowed to vaporize into the ambient air to attract the animals. Another way is to pour the liquid scent lure onto trees or on the ground at either real or artificially created scrapes where a horned animal might mark his territory. The liquid scents may also be dripped in a controlled manner on either the real or artificial scrape.

Cold weather has a severe and adverse effect in the vaporization of the liquid scent lure. In subfreezing conditions, the liquid scent may actually freeze and thereby render the product far less effective. In cold but above subfreezing conditions, the vaporization may be greatly slowed.

In view of the cold weather problem, there have been efforts to improve the vaporization process. One effort is to place a battery operated heating element within a wick which is placed within the open bottle. Another method is to leave the bottle open and place a heating means about the bottle to heat the scent liquid. However, these methods are inefficient in actually warming the liquid scent lure to anywhere near animal body temperature.

There is a need for a highly efficient dispenser that will readily warm the liquid animal scent lure from within a container while the lure is on the outside of the container having a substantial surface area for scent dissipation. The dispenser should have insulation qualities as to efficiently use the heat source within. The dispenser should also be water proof to assure that rain will not stop the heat. Lastly, the dispenser should be readily inoperable when no longer in use and readily operable for use.

SUMMARY OF THE INVENTION

A heated animal scent lure dispenser includes a container with an interior, exterior, threaded neck and opening at the neck. A cap is threadable onto the neck for at least partially closing the opening. A heating element or chemical charge is locatable within the container which will in turn heat the container. A wick suitably made from a knit fabric substantially covers the container with a large surface area upon which the liquid scent lure may be placed and from which the liquid scent lure may be dispersed under the influence of the heated container. The wick may also have insulation qualities and a suitable plastic bag or the like may be used to seal the dispenser within the bag and to starve the dispenser from oxygen.

A principal object and advantage of the heated animal scent lure dispenser is that it has substantial surface area on the wick for liquid scent lure dispersion after the wick has been heated from within the container in the most efficient manner.

Another object and advantage of the present invention is that the wick which encloses the container and heating means also insulates the heating element and container as to not permit quick heat dissipation.

Another object and advantage of the present invention is that the lure dispenser is waterproof and will not stop its heat radiation even if it becomes wet.

Another object and advantage of the present invention is that it is the most efficient method of heating a lure for dispersion into the ambient air as opposed to less inefficient methods such as heating a bottle with liquid scent lure therein or heating a wick within the open bottle.

Another object and advantage of the present invention is that it is relatively inexpensive to manufacture and inexpensive to operate, requiring no batteries.

Another object and advantage of the present invention is that the heated animal scent lure dispenser may be readily rendered inoperable by placing it in a sealable bag to shut down the exposure of the heating means from oxygen, which will generate heat from the chemical charge of one embodiment.

Another object and advantage of the present invention is that it heats the liquid scent lure to approximately the body temperature of the animal to facilitate the dispersion of the aromatic qualities of the scent effectively and to mimic natural scents dispersed from the animals.

Other objects and advantages will become readily apparent upon review of the following figures, specification and appended claims.

BRIEF DESCRIPTION OF THE DRAWINGS

FIG. 1 is a perspective view of the heated animal scent lure dispenser mounted in a tree branch with a hand operable scent lure applicator shown in phantom outline;

FIG. 2 is a front elevational view of the dispenser with an activated carbon heating means with portions thereof broken away for ease of understanding;

FIG. 3 is a front elevational schematic view of a heating element; and

FIG. 4 is a bottom plan view of the dispenser enclosed in a plastic sealable bag shown in phantom outline.

DETAILED DESCRIPTION

Figure 2A:
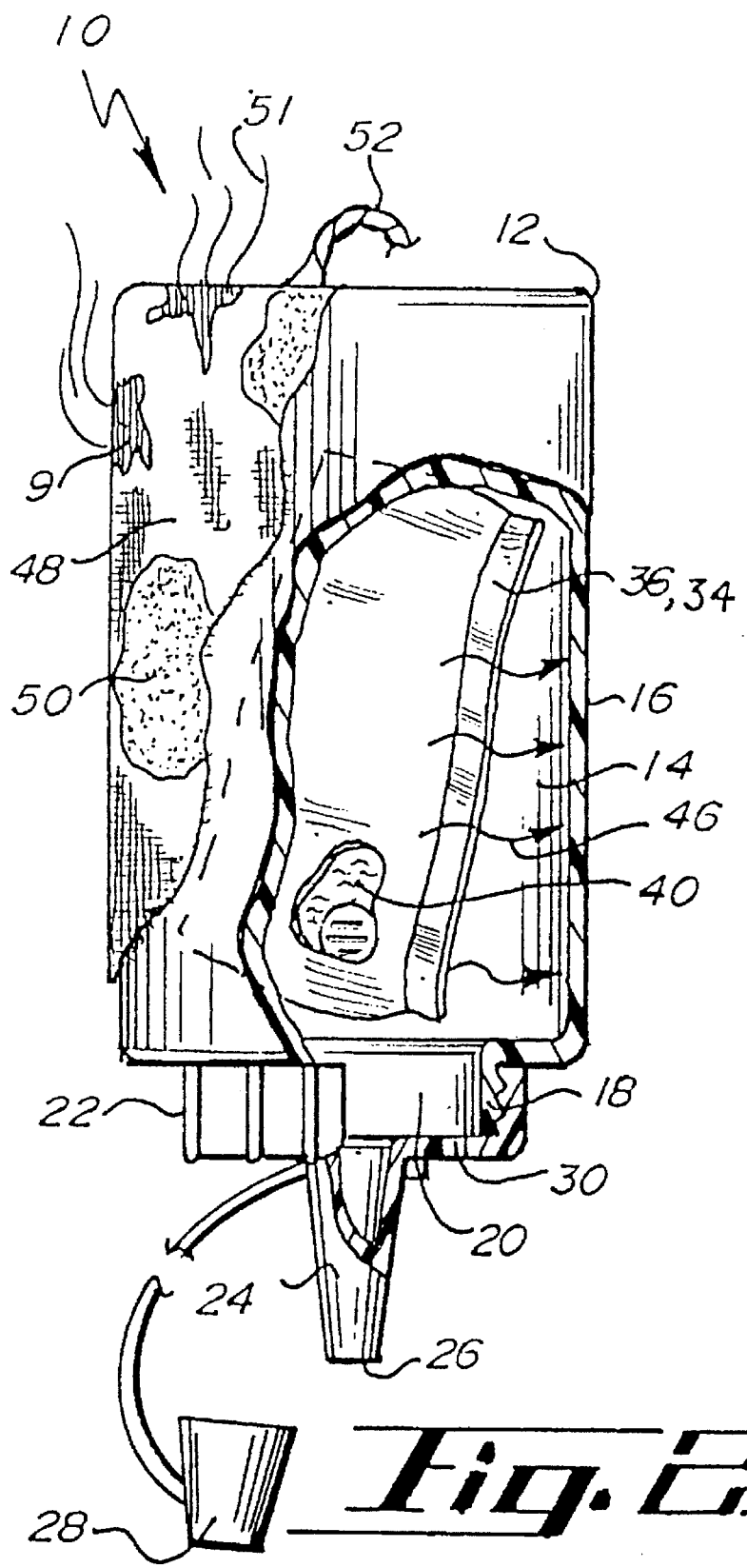
FIG. 2A is front elevational view of the dispenser similar to FIG. 2 with an acetate heating means with portions thereof broken away for ease of understanding.

Referring to FIGS. 1–4, the heated animal scent lure dispenser 10 may generally be understood. Generally, the dispenser 10 is comprised of a container 12, a cap 22, a heating means 34, and an outer wick 48.

More specifically, the container 12 may be economically made of plastic which is heat conductive and will not absorb the liquid scent lure. The container 12 has an interior 14, an exterior 16 and a threaded neck portion 18 whereat opening 20 is located. A threadable cap 22 is placeable in interlocking rotational engagement with the threaded neck portion 18. The cap or lid 22 has a carburetor tip 24 with an opening 26 therein. A lid or cap 28 is suitably provided for closing the opening 26 in order to control or carburet the air that would otherwise enter the container 12. The cap 22 may also have openings or apertures 30 to further assist in ambient air movement with oxygen into the interior 14 of container 12.

Heating means 34 are placeable within the interior 14 of container 12 which suitably may be approximately 90 cubic centimeters. One heating means 34, as shown in FIG. 2, comprises an envelope 36 with a carbon chemical charge 38 comprised of iron activated carbon, salt and water. This type of heating means 36, 38 is readily available within porous or fibrous bags that are sealed within plastic to keep the air or oxygen from generating the chemical reaction wherein one byproduct is heat. These devices are currently sold under the trademark GRABBER® by Mycoal Warmers Co., Ltd. of Concord, Calif.

Another heating means may be a acetate chemical charge 40 of super-cooled sodium acetate solution, viscosity increasing agent and flexible metal within envelope 36 shown in FIG. 2A. The solution is super-cooled by being outdoors with the hunter during the cool or cold fall season. Alternatively, the solution could be stored within a refrigerator. Upon flexation of the metal, the small pieces of minute metal nodules which break off the metal strip or piece, begin the crystallization of the sodium acetate wherein heat is a byproduct. The chemical charge 40 may be regenerated by boiling envelope 36 for six to ten minutes for reuse.

Another heating means 34 may be by the combination of battery 42 and heat generating resistive element 44, as is known. It will be appreciated that all heating means 36, 38, 40, 42 and 44 will generate heat shown by arrows 46.

Wick 48 is suitably made from a knit fabric with a fleece. The wick 48 appropriately may be camouflaged 50. The wick 48 is appropriately of a thickness to have insulation qualities to slow the heat dissipation 46 from within the interior 14 of container 12 which heats the scent lure 9 and creates the heated scent lure dispersion 51. Hanger 52 may be provided for hanging the dispenser 10 from a branch 5. A plastic zip lock or sealable bag 54 suitably may be provided for keeping the activated dispenser 10 within an air tight compartment to effectively stop the availability of oxygen and to stop the heat process for heating means 36 and 38. Simple removal of the lure dispenser 10 from the plastic bag 54 will again expose the heating means 36 and 38 to air or oxygen to again begin the heating process for dispersion of the scent lure 9.

In operation, the container 12 with the wick 48 substantially covering the exterior 16 is grasped and the cap 22 is removed. One of the heating means 34 is appropriately chosen and placed into the interior 14 of the container 12 after activation. Thereafter, the cap 22 is again screwed onto the neck 18. The dispenser may next be positioned with hanger 52 onto a branch or twig. Next, the scent lure 9 may be placed onto the wick 48 suitably by a hand operable scent lure applicator, eye dropper 7 or poured out at the discretion of the individual. Lid or cap 28 may close opening 26 depending upon how quickly one wishes the lure dispenser 10 to heat up.

If use is to terminate before the heating means 34 is depleted when the envelope 36 and chemical charge 38 are being used, the lure dispenser 10 may be placed within a sealable plastic bag 54 to stop the heating process and to save the chemical charge 38 for the next application.

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed:

1. A heated animal scent lure dispenser for attracting animals, comprising:
   (a) a container with an interior, an exterior and an opening;
   (b) a cap for at least partially closing the opening;
   (c) a heating means placeable within the interior of the container for heating the container wherein the heating means is comprised of a chemical charge of iron, activated carbon, salt and water; and
   (d) a wick covering the container for absorbing a scent lure placed thereon and for dispensing the scent lure heated thereon by the heating means within the container.

2. The dispenser of claim 1, wherein the cap has at least one opening therethrough.

3. The dispenser of claim 2, further comprising a closing lid for at least one cap opening.

4. The dispenser of claim 1, wherein the heating means is comprised of a chemical charge of super-cooled sodium acetate solution, viscosity increasing agent and flexible metal.

5. The dispenser of claim 1, wherein the wick is a knit fabric with fleece.

6. The dispenser of claim 1, wherein the wick substantially covers the exterior of the container.

7. The dispenser of claim 6, wherein the wick insulates the container.

8. The dispenser of claim 6, wherein the wick has camouflage thereon to disguise the dispenser.

9. A heated animal scent lure dispenser for attracting animals, comprising:
   (a) a container with an interior, an exterior and an opening;
   (b) a cap for at least partially closing the opening;
   (c) a heating means placeable within the interior of the container for heating the container; and
   (d) a wick comprised of a knit fabric substantially covering the container for absorbing a scent lure placed thereon and for dispensing the scent lure heated thereon by the heating means within the container.

10. The dispenser of claim 9, wherein the cap has at least one opening therethrough.

11. The dispenser of claim 10, further comprising a closing lid for at least one cap opening.

12. The dispenser of claim 9, wherein the heating means is comprised of a chemical charge of iron, activated carbon, salt and water.

13. The dispenser of claim 9, wherein the heating means is comprised of a battery and a heat generating resistive element.

14. The dispenser of claim 9, wherein the heating means is comprised of a chemical charge of super-cooled sodium acetate solution, viscosity increasing agent and flexible metal.

15. The dispenser of claim 9, wherein the wick further comprises fleece.

16. The dispenser of claim 9, wherein the wick insulates the container.

17. The dispenser of claim 8, wherein the wick has camouflage thereon to disguise the dispenser.

18. A heated animal scent lure dispenser for attracting animals, comprising:
   (a) a container with an interior, an exterior and an opening;
   (b) a cap for at least partially closing the opening;

(c) a heating means placeable within the interior of the container for heating the container; and (d) a wick comprised of a camouflaged knit fabric with fleece covering and insulating the container, the wick adapted for absorbing a scent lure placed thereon and for dispensing the scent lure heated thereon by the heating means within the container.

19. The dispenser of claim 18, wherein the cap has at least one opening therethrough.

20. The dispenser of claim 19, further comprising a closing lid for at least one cap opening.

21. The dispenser of claim 18, wherein the heating means is comprised of a chemical charge of iron, activated carbon, salt and water.

22. The dispenser of claim 18, wherein the heating means is comprised of a battery and a heat generating resistive element.

23. The dispenser of claim 18, wherein the heating means is comprised of a chemical charge of super-cooled sodium acetate solution, viscosity increasing agent and flexible metal.

24. A heated animal scent lure dispenser for attracting animals, comprising:

(a) a container with an interior, an exterior and an opening;

(b) a cap for at least partially closing the opening;

(c) a heating means placeable within the interior of the container for heating the container, wherein the heating means is comprised of a chemical charge of iron, activated carbon, salt and water; and (d) a wick at least partially covering the container for absorbing a scent lure placed thereon and for dispensing the scent lure heated thereon by the heating means within the container.

25. A heated animal scent lure dispenser for attracting animals, comprising:

(a) a container with an interior, an exterior and an opening;

(b) a cap for at least partially closing the opening;

(c) a heating means placeable within the interior of the container for heating the container wherein the heating means is comprised of a chemical charge of super-cooled sodium acetate solution, viscosity increasing agent and flexible metal; and (d) a wick at least partially covering the container for absorbing a scent lure placed thereon and for dispensing the scent lure heated thereon by the heating means within the container.

26. A heated animal scent lure dispenser for attracting animals, comprising:

(a) a container with an interior, an exterior and an opening;

(b) a cap for at least partially closing the opening;

(c) a heating means placeable within the interior of the container for heating the container; and (d) a wick substantially covering the container for absorbing a scent lure placed thereon and for dispensing the scent lure heated thereon by the heating means within the container.

27. The dispenser of claim 26, wherein the heating means is comprised of a chemical charge of iron, activated carbon, salt and water.

28. The dispenser of claim 26, wherein the heating means is comprised of a battery and a heat generating resistive element.

29. The dispenser of claim 26, wherein the heating means is comprised of a chemical charge of super-cooled sodium acetate solution, viscosity increasing agent and flexible metal.

30. The dispenser of claim 26, wherein the wick is a knit fabric with fleece.

31. The dispenser of claim 26, wherein the wick substantially covers the exterior of the container.

32. The dispenser of claim 26, wherein the wick insulates the container.

33. The dispenser of claim 26, wherein the wick has camouflage thereon to disguise the dispenser.

\* \* \* \* \*